Sept. 25, 1928.
F. P. BREEN
1,685,702
SPIRAL DRIVE DEVICE
Filed July 11, 1925      4 Sheets-Sheet 3
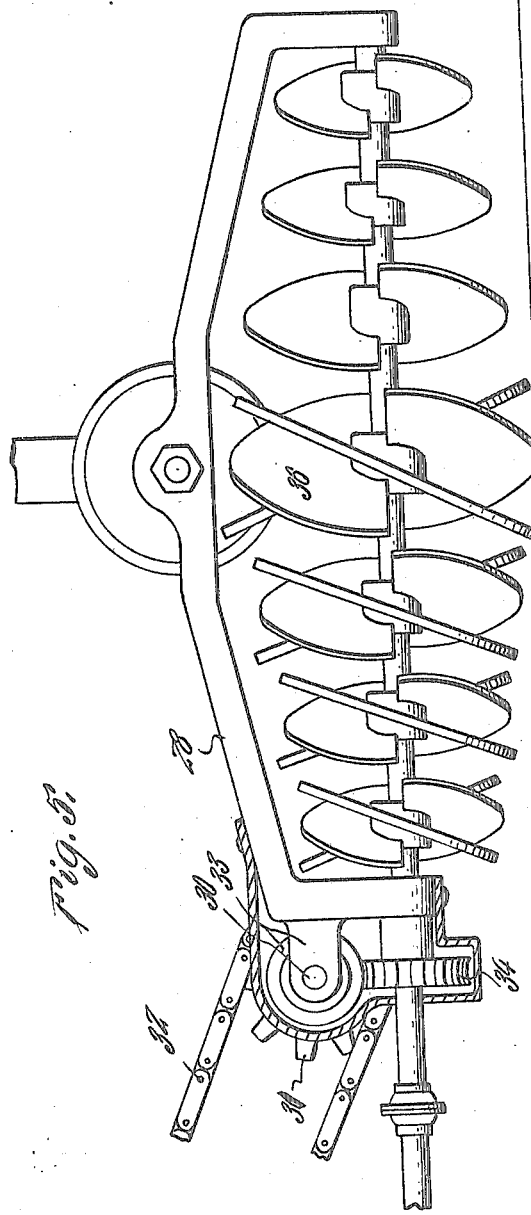
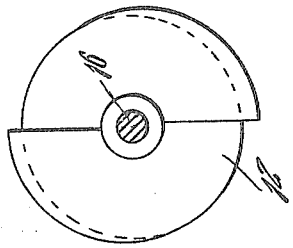
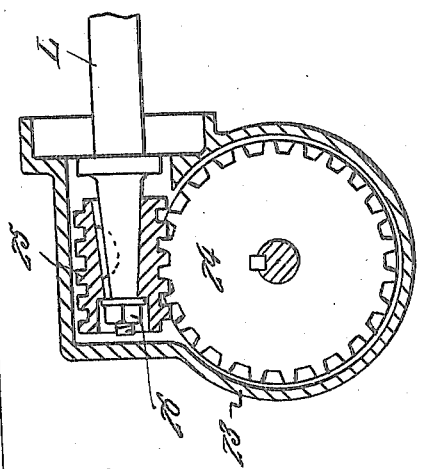
F. P. Breen
INVENTOR
BY Victor J. Evans
ATTORNEY

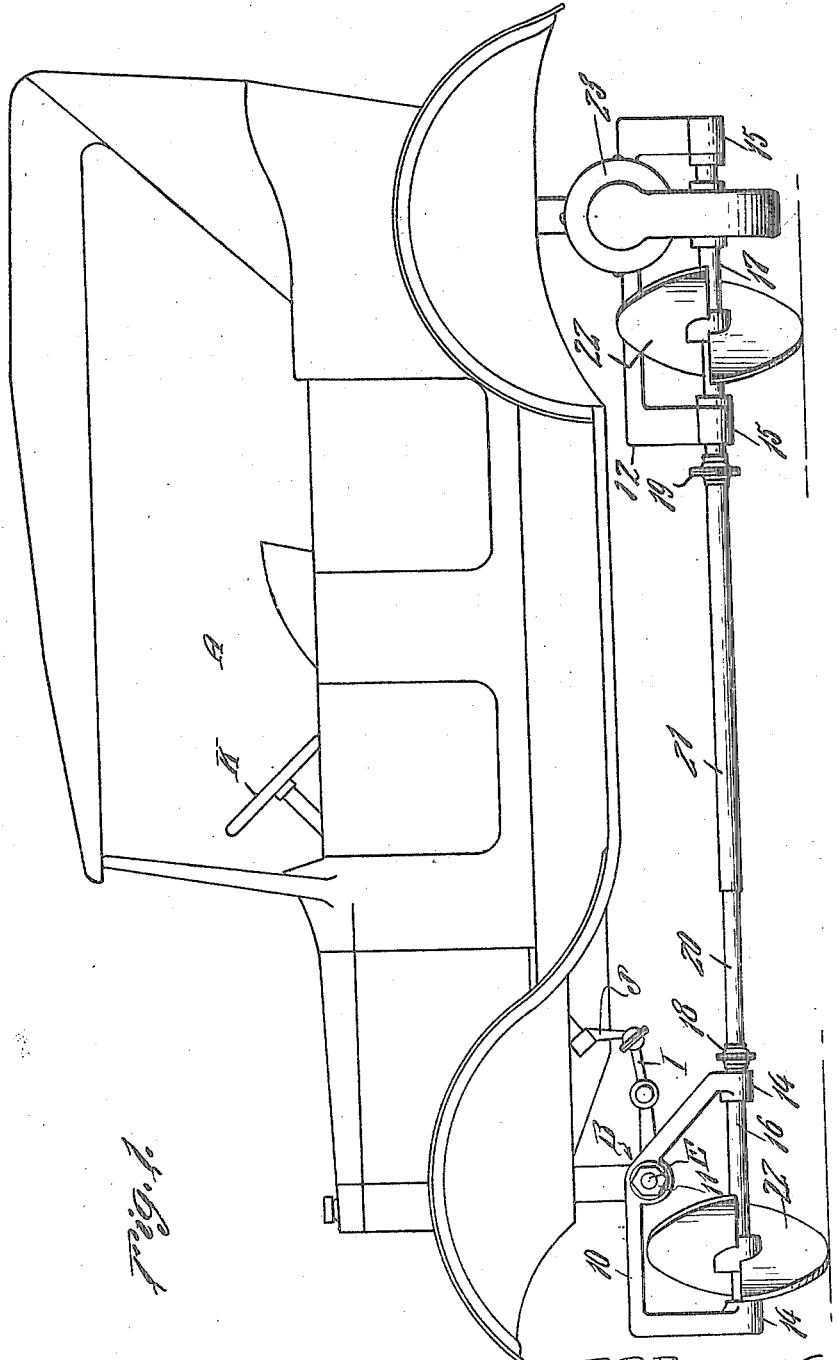

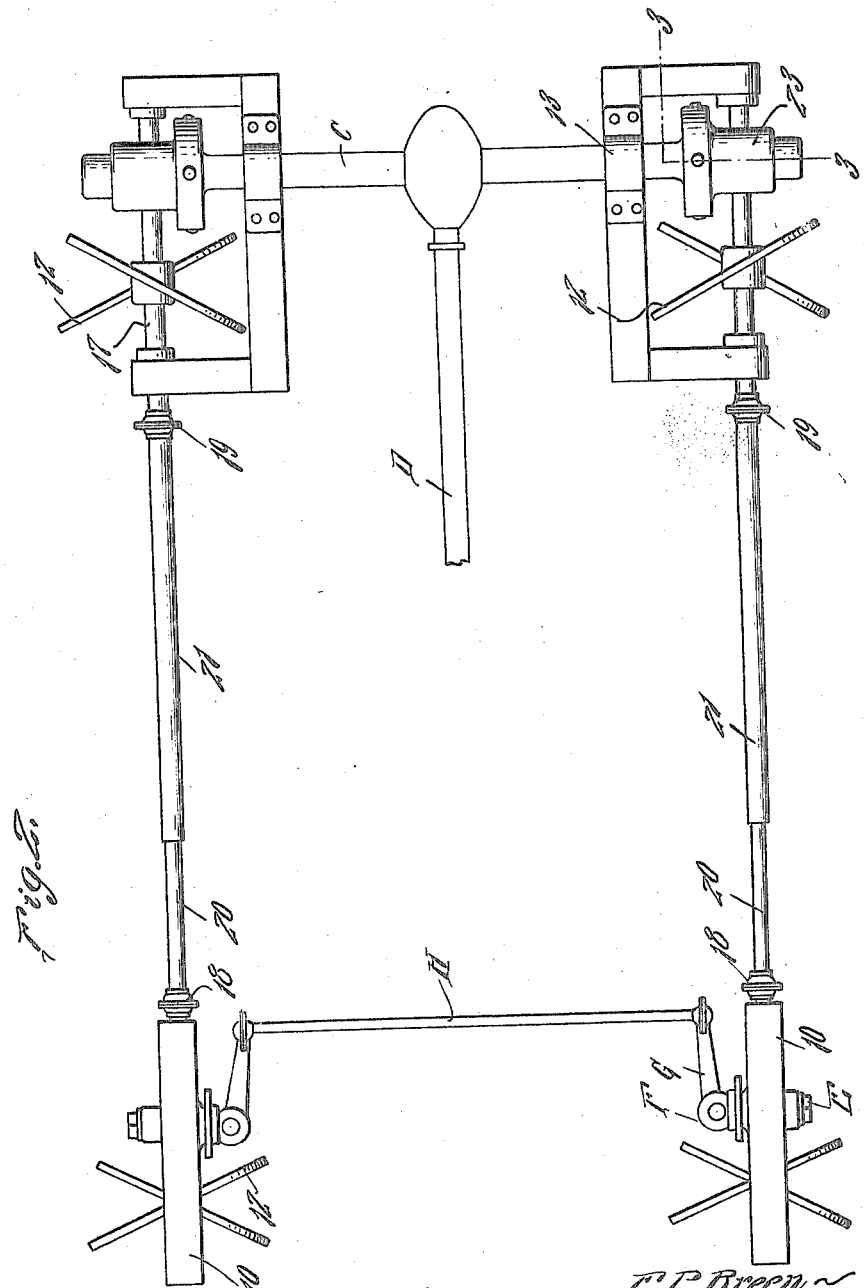

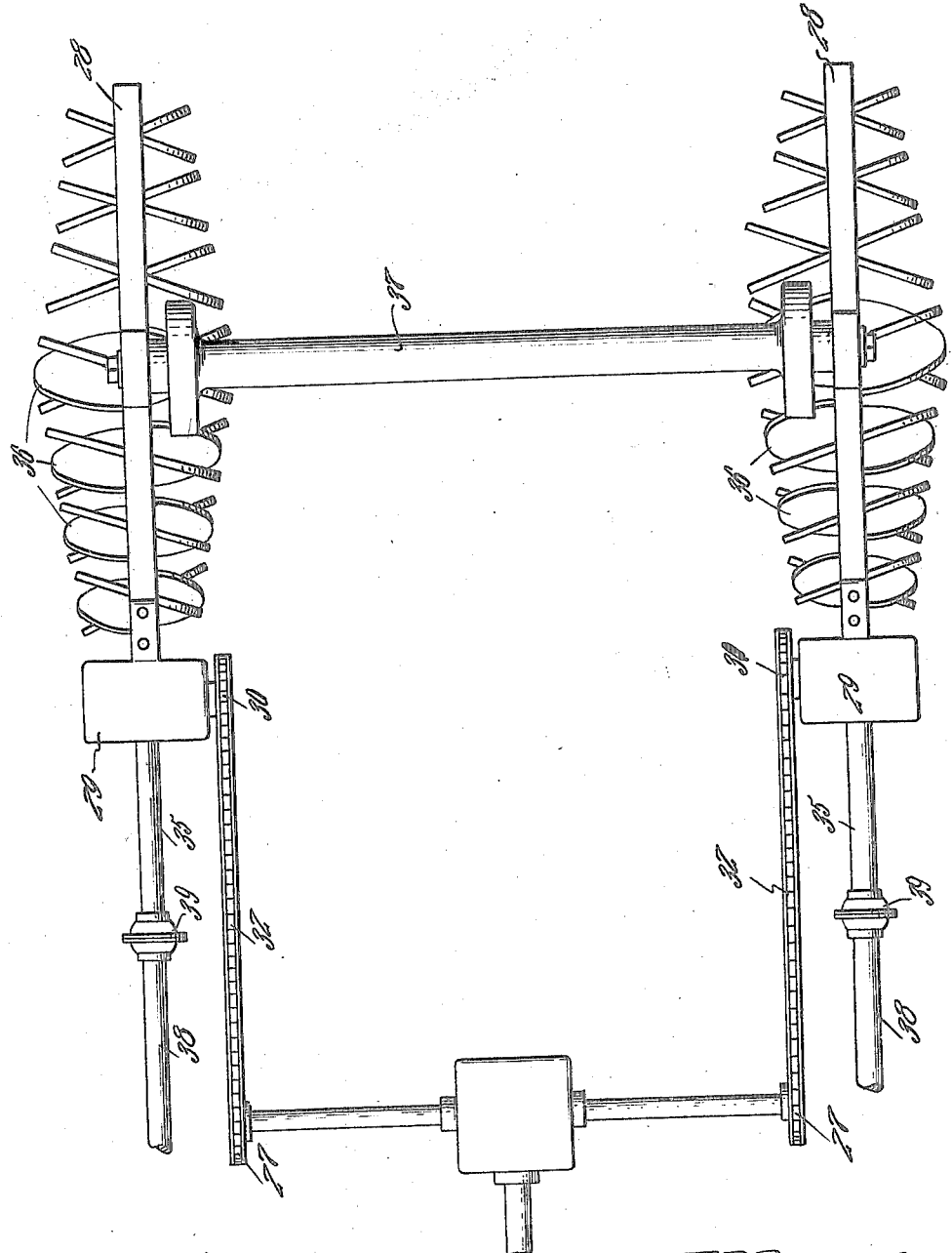

Patented Sept. 25, 1928.

1,685,702

UNITED STATES PATENT OFFICE.

FREDERICK PAUL BREEN, OF SPRINGFIELD, MASSACHUSETTS.

SPIRAL DRIVE DEVICE.

Application filed July 11, 1925. Serial No. 43,056.

This invention relates to drive mechanism for motor vehicles and has for its object the provision of a novel drive designed for use in connection with automobiles, sleds, ice boats, power skates and the like whereby to effect propulsion over ice or packed snow.

An important object is the provision of a drive mechanism adapted for use in connection with vehicles and so constructed as to be applied thereto as an attachment or as part of the original equipment, as preferred.

A further object is to provide a drive mechanism embodying interrupted spiral blade elements which bite into the snow or ice and which are provided with driving means so that when rotated they will advance or propel the vehicle.

The invention further contemplates various novel details of construction and arrangement which will be hereinafter more fully pointed out.

An additional object is to provide a structure of this character which will be simple and inexpensive to manufacture and install, easy to control, positive in action, efficient and durable in service, and a general improvement in the art.

With the above and other objects and advantages in view, the invention consists in the details of construction and arrangement of parts to be hereinafter more fully described and claimed, and illustrated in the accompanying drawings in which:

Figure 1 is a side elevation of the spiral drive mechanism showing it applied as an attachment to a motor vehicle, Figure 2 is a plan view of the apparatus shown in Figure 1, Figure 3 is a detail section on the line 3—3 of Figure 2, Figure 4 is a plan view of the drive mechanism constructed as an attachment in the nature of a trailer for use in connection with vehicles, Figure 5 is a side elevation thereof, and Figure 6 is a detail cross section through one of the spiral propelling members.

Referring more particularly to the drawings and especially to Figures 1, 2 and 3, the letter A designates a motor vehicle which in the present instance is represented as an automobile but which could obviously be of some other type. This vehicle is shown as including the usual chassis embodying a front axle B, a rear axle housing C, and a drive shaft housing D connected with the rear axle housing. The front construction further includes the usual spindles E upon which the front wheels are ordinarily mounted and these spindles are carried by spindle bodies F pivoted on the axle and equipped with steering arms G connected with a steering arm connecting rod H and adapted to be moved by means of a steering rod I connected in the ordinary manner with the steering arm J controlled by the steering wheel K. The rear construction includes the usual spindles L which of course extend within the rear axle housing. All these parts are old and well known and no claim is made thereto though their illustration and description are necessary to give a clear understanding of the present invention.

In carrying out the invention it is obvious that the vehicle wheels must be removed from their accustomed places on the front and rear spindles and they are replaced by an attachment which includes front frame members 10 of angular formation apertured for engagement upon the front spindles E and held thereon by nuts 11 or the like. The attachment further includes rear frame members 12 embodying clamping elements 13 engaging upon the rear axle housings. The frame members 10 and 12 are provided respectively with bearings 14 and 15 within which are journaled shafts 16 and 17 having universal joint connections 18 and 19 with telescopic shaft members 20 and 21. By this arrangement it will be seen that the frame members 10 and 12 may be arranged different distances apart depending upon the wheel base of the vehicle to which the attachment is applied.

The shafts 16 and 17 carry the propelling blades 22 which are similar and each of which is formed as an interrupted or partial spiral having its edge adapted to bite into ice or packed snow so as to effect a propelling action when rotated.

Secured, in any desired manner, upon the outer ends of the rear axle housings C are housings or casings 23 through which the shafts 17 extend, and within these casings the shafts carry worm wheels 24 meshing with worms 25 suitably mounted on the spindles L as for instance by means of the usual nuts 26 provided for holding the rear wheels in place when wheels are used.

In the operation it will be quite apparent that when the vehicle motor is running the rear spindles L will be driven and the worms 25 thereon meshing with the worm wheels 24 will effect rotation of the shafts 17. As these shafts are connected with the forward shafts 16 by the universal joints 18 and 19 and the telescopic shaft members 20 and 21 it is evident that the front propelling members will also be rotated, thus giving the equivalent of a four wheel drive. Steering is effected in the usual manner by turning the steering wheel K and swinging the front frames 10 carrying the front driving members.

In Figures 4 and 5 I have shown a modification in which the rear spindles of the vehicle carry sprockets 27. In this instance the driving mechanism is formed as a trailer and includes frames 28 carrying housings 29 within which are journaled shafts 30 carrying sprockets 31 about which are trained chains 32 in turn trained about the sprockets 27. The shafts 30 also carry worms 33 meshing with worm wheels 34 on longitudinally extending shafts 35 each of which carries a plurality of interrupted spiral blades 36 which may, if preferred, be of progressively different sizes, the smaller ones being at the ends and the larger ones being at the center as clearly indicated in the drawings. The frames 28 are preferably connected by a suitable bar structure 37 so as to be maintained in the proper spaced relation. Any desired drive means of an equivalent nature or of the same nature illustrated in Figures 1 and 2 may be employed at the front of the vehicle and the drive elements thereof would of course be driven from the shafts 35 by intermediate shafts 38 connected therewith by universal joints 39.

The operation of this modified form is of course the same as that of the first described form and in both instances it will be apparent that a strong propelling action will be had as the rapidly rotating spiral blades cutting into the ice or snow obviously advance or progress the vehicle at a sufficiently high rate of speed to insure rapid travel.

From the foregoing description and a study of the drawings it is believed the construction, operation and advantages will be readily apparent to one skilled in the art without further elaboration.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. A drive mechanism for a motor vehicle from which the front and rear wheels have been removed, comprising frame members mounted upon the front axle spindles, other frame members of angular form mounted upon the end portions of the rear axle housings, shafts journaled within the respective frame members, spiral blades mounted on said shafts, and telescopic shafts having universal joint connections with the first named shafts at each side of the vehicle.

2. A drive mechanism for a motor vehicle from which the front and rear wheels have been removed, comprising frame members mounted upon the front axle spindles, other frame members of angular form mounted upon the end portions of the rear axle housings, shafts journaled within the respective frame members, spiral blades mounted on said shafts, telescopic shafts having universal joint connections with the first named shafts at each side of the vehicle, the second named frame members including housing portions, worm wheels mounted on said shaft within the second named frame members and located within said housing portions thereof, and worms on the rear spindles meshing with said worm wheels.

In testimony whereof I affix my signature.

FREDERICK PAUL BREEN.